United States Patent Office 2,882,261
Patented Apr. 14, 1959

2,882,261

THERMOPLASTIC MOLDING COMPOSITION OF CYCLOHEXYL METHACRYLATE, METHYL METHACRYLATE AND AN ACRYLIC ACID ESTER OF A SATURATED ALCOHOL HAVING LESS THAN 3 CARBON ATOMS

Barnard M. Marks, Wilmington, Del., assignor to E. I. du Pont de Nemours and Company, Wilmington, Del., a corporation of Delaware No Drawing. Application July 21, 1954
Serial No. 444,913

5 Claims. (Cl. 260—80.5)

This invention relates to thermoplastic compositions and more particularly to ternary polymers of acrylic and methacrylic acid derivatives having improved flow and thermal stability.

In the industrial plastic art, particularly in the preparation of molded products from polymerized unsaturated compounds, it is essential that the polymeric resin used should have properties which permit satisfactory flow in the molding, extruding, or other device employed in order that the smallest interstice of the mold cavity may be filled to its very extremity. Low melt viscosity is also essential for rapid penetration in injection molding and for high production in extrusion processes. Moreover, substantially no loss in service stability, i. e., heat stability in the molded part, can be tolerated. Furthermore, the resin should have such a chemical and physical structure that it can preferably be dispersed during its polymerization to form a molding powder having discrete particles that resist clustering, which powder flows easily through charging hoppers of extrusion equipment and the like.

The plastic industry today molds articles of greater weight and more intricate shape than was considered possible but a few years ago. The industry, however, insists that the goal should be still larger and more intricate products; the modern, all plastic car body is but an example of the current advance in these directions.

The aforesaid demands of the industry places a heavy burden on the resin manufacturer. Homopolymeric resins do not have the properties of flow and service stability required. Consequently, the manufacturer has made many attempts to overcome the disadvantageous properties of the homopolymer by the production of copolymers of various types. According to the art there appears to be no solution to the problem in this direction, however, for the synthesis of copolymers has resulted heretofore in an improvement of polymer flow during molding with an undesirable corresponding loss of service stability or, contrariwise, an improved service stability with a loss in melt flow characteristics. As improvements in both properties are required, the prior art products have been incapable of satisfying these insistant and meticulous demands of the industry.

An object of the present invention is to provide new thermoplastic materials principally for use in industrial molding operations. Another object is to provide molding powder compositions having improved flow under cavity charging and filling operations with improved service stability. A further object is to provide ternary polymers of acrylic and methacrylic acid esters having improved granulating characteristics, together with improved flow under normal extruding operations and improved service stability in the fabricated article. Other objects and advantages of the invention will hereinafter appear.

In accord with this invention, an improved thermoplastic material is prepared, having the above desirable properties, by the copolymerization of a ternary polymer of cyclohexyl methacrylate, ethyl acrylate, and methyl methacrylate. This thermoplastic ternary composition is prepared from a mixture of the liquid monomers containing from about 2% to about 8% by weight of a mixture of an acrylic acid ester (such as methyl and ethyl acrylate) and cyclohexyl methacrylate; the remainder of the mixture of monomeric liquids present, to give a total of 100% by weight, is monomeric methyl methacrylate. The ternary composition, obtained by the copolymerization of this mixture of monomers, has unusual service stability at temperatures up to approximately 95° C. to 100° C., moreover, the mixture of monomers can be copolymerized, and is preferably copolymerized, in the granular state in an aqueous medium to form a dispersed ternary polymer in the form of discrete particles which, on subsequent separation and drying, is nonclustering. Furthermore, the dispersed polymer flows freely under normal molding and extruding temperatures, and in the form of a melt has a low melt viscosity that rapidly and completely fills molds of the most involved and intricate shapes.

The examples which follow describe processes for the preparation of the ternary polymer of the invention in which parts are by weight unless otherwise indicated.

*Example I.*—Into a reaction vessel provided with an efficient stirrer, there was placed 93 parts of methyl methacrylate, 3 parts of ethyl acrylate, and 4 parts of cyclohexyl methacrylate together with .10 part of di(2-mercapto ethyl)sulfide and a catalyst mixture containing 0.35 parts of alpha, alpha'-azodiisobutyronitrile and .05 part of alpha, alpha'-cyclohexane carbonitrile. To facilitate the dispersion, .02 part of methyl salicylate, 1 part of anhydrous hydrogen disodium phosphate, 0.7 part of sodium hypophosphite, and 2.5 parts of a 1% solution of polymethacrylic acid were added. Water was introduced to the extent of 190 parts and the resulting mixture subjected to agitation, while the temperature was gradually increased to the point at which polymerization commenced, about 92° C. After approximately 40 minutes, at temperatures between 120° C. and 130° C., the ternary polymer of methyl methacrylate, ethyl acrylate and cyclohexyl methacrylate formed as discrete particles of resin which settled out. They were then separated from the reaction mixture by decantation, were washed and dried at a temperature of about 50° C.

*Example II.*—A ternary copolymer of 93.5% methyl methacrylate, 2.5% ethyl acrylate, and 4.0% cyclohexyl methacrylate, having improved melt flow ability and thermal service stability, was prepared substantially in accord with the process of Example I, except that hydrated dihydrogen sodium phosphate was added, prior to polymerization, to give an initial pH between 6.2 and 6.35. Granulation was improved in uniformity of particle size, while clusters and adhesions in the granulating equipment were completely eliminated.

In preparing the ternary polymers, a wide range of water to monomer ratios can be used although a water to monomer ratio of 2:1 is recommended. The pH of the solution should be adjusted between about 5½ and 8.5, preferably by the use of disodium hydrogen phosphate or sodium dihydrogen phosphate, although other suitable buffers may be employed for this purpose. None, however, has been found that is as satisfactory as the above phosphates. Polymethacrylic acid, to the extent described in the examples, may be used as a dispersing aid, and its concentration may range between 0.5 to 3 parts per 100 parts by weight of the monomers present.

While the examples describe methods of preparing the ternary polymer, any other suitable method may be used for copolymerizing these esters. They may be copolymerized, for example, by solution copolymerization or by solid copolymerization in accord with the well-established solution or solid copolymerization processes of the prior art. If the polymers so produced are to be used in the molding industry, the polymers, as recovered after evaporation of the solvent from solution polymerization, and the polymers, as directly produced by solid polymerization, may be comminuted by any suitable mechanical method into a pulverulent form for feeding into the extrusion device.

A suitable type catalyst for the polymerization should be employed, such, for example, as the azo catalyst described in the Hunt U.S. Patent 2,471,959, issued May 13, 1949. The peroxygen type catalysts such as hydrogen peroxide, benzoyl peroxide, or any other suitable catalyst may, however, be used. Inasmuch as azo catalyst are highly effective for the homopolymerization reactions generally, and for initiating copolymerization of the acrylic esters, they are preferred.

A further feature of the invention involves the use of telogenic thermal stabilizers. These stabilizers are incorporated in the mixture of the monomers prior to their copolymerization, and have been found to improve the thermal stability of the final thermoplastic resin. For this purpose, such thermal stabilizers as di(mercaptoalkyl)sulfides, and more particularly di(2-mercaptoethyl)sulfides, may be used. Other equivalents of this thermal stabilizer are the (mercapto-alkyl)sulfides generally, having the formula HS—R—S—R—SH in which R is an alkyl group, such as methyl, ethyl, propyl, or higher alkyl or other hydrocarbon group. These thermal stabilizers are used preferably in amounts ranging from 0.05 to 0.75% of the ternary polymer.

While the ternary copolymeric mixtures described above possess superior properties, it has been found that compositions containing, in parts by weight, 1.5 to 3% ethyl methacrylate, 2 to 5% cyclohexylmethacrylate, and the remainder methyl methacrylate to make 100% of these three components, with the first two present to the extent of no more than 8%, have like properties, although the ternary copolymer made from 93.5% methyl methacrylate, 2.5% ethyl acrylate, and 4% cyclohexyl methacrylate possesses optimum melt flow, exceptional thermal service stability with a high reduction in heat distortion and a remarkable retention of physical properties when compared with commercial heat resistant acrylic molding powders. The presence of the acrylic acid esters and particularly ethyl acrylate has been found to effect a substantial lowering of the melting point of methyl methacrylate polymer. Such a binary copolymer, however, has poor thermal service stability. The presence of cyclohexyl methacrylate in a methyl methacrylate binary copolymer raises the melting point but does not affect melt flow rates. The chemical addition of cyclohexylmethacrylate to the copolymer of methyl methacrylate and ethyl acrylate, to the extent described, synergistically results in a ternary copolymer having a retention of the high melt flow rate with superior thermal service properties. These are properties especially sought for by the industrial molder of massive shapes.

The ternary copolymer of the invention exhibits its many advantages over the thermoplastics of a comparable nature when used without fillers or other modifying agents. For certain purposes, however, such, for example, as in those applications requiring minimum melt flow, fillers and reinforcing agents may be added to the copolymer and the composite mixture fabricated into the desired shape by flowing and/or the copolymer extruded from the melt into a cavity containing reinforcing agents, such as staple-orlon, nylon, fiber glass, or other reinforcing agents.

The above examples are merely illustrative of the compositions covered by this application. Those skilled in the art will realize that the temperatures, pressures, modes of operation and ingredients may be varied through wide limits without departing from the scope of the invention. Moreover, the molding composition produced may be used per se or combined with other plastic compositions.

I claim:

1. A thermoplastic molding composition having a high-melt flow rate and superior thermal service stability comprising a ternary polymer containing, in a copolymerized state, from about 2 to about 5 parts by weight of cyclohexyl methacrylate and from about 1.5 to about 3 parts by weight of an acrylic acid ester of a saturated alcohol having less than three carbon atoms, the remainder of the polymer, to make a total of 100 parts by weight, being methyl methacrylate.

2. A molding powder comprising a ternary polymer composition containing, in a copolymerized state, from about 2 to about 5 parts by weight of cyclohexyl methacrylate, from about 1.5 to about 3 parts by weight of an acrylic acid ester of a saturated alcohol containing less than three carbon atoms, these esters constituting no more than 8 parts by weight of the total copolymer, the remainder of the polymer, to make a total of 100 parts by weight, being methyl methacrylate.

3. A molding powder comprising a ternary polymer composition containing, in a copolymerized state, from about 2 to about 5 parts by weight of cyclohexyl methacrylate, from about 1.5 to about 3 parts by weight of ethyl acrylate, these esters constituting no more than 8 parts by weight of the total copolymer, the remainder of the polymer, to make a total of 100 parts by weight, being methyl methacrylate.

4. A molding powder comprising a ternary polymer composition containing, in a copolymerized state, about 2.5 percent by weight of ethyl acrylate, about 4 percent by weight of cyclohexyl methacrylate, and about 93.5 percent by weight of methyl methacrylate.

5. In a process for the preparation of a ternary polymer of acrylic and methacrylic esters as a granular powder, the steps which comprise dispersing in water a mixture of organic compounds consisting of cyclohexyl methacrylate methyl methacrylate, and an acrylic acid ester of a saturated alcohol having less than three carbon atoms, adding an alkali metal acid phosphate to give a pH between about 5.8 and about 8.5, effecting the copolymerization by heating, and initiating the reaction by an acrylic polymerization catalyst.

References Cited in the file of this patent

UNITED STATES PATENTS

| | | |
|---|---|---|
| 2,161,481 | Marks | June 6, 1939 |
| 2,258,188 | Matheson et al. | Oct. 7, 1941 |
| 2,565,141 | Marks | Aug. 21, 1951 |